(12) United States Patent
Lozano et al.

(10) Patent No.: US 7,168,003 B2
(45) Date of Patent: Jan. 23, 2007

(54) METHOD AND APPARATUS FOR AUTOMATING PRINTER AND PRINTER DRIVER DIAGNOSTICS AND REPAIR

(75) Inventors: Rosa Aurora Lozano, Roseville, CA (US); Thomas Tripp, El Dorado Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 439 days.

(21) Appl. No.: 10/213,986

(22) Filed: Aug. 7, 2002

(65) Prior Publication Data

US 2004/0030809 A1 Feb. 12, 2004

(51) Int. Cl.
- G06F 11/00 (2006.01)
- G06F 3/00 (2006.01)
- G06F 15/16 (2006.01)
- G01M 19/00 (2006.01)

(52) U.S. Cl. .......................... 714/25; 714/27; 702/108; 702/122; 710/8; 709/217

(58) Field of Classification Search .................... 710/8; 709/217; 705/35; 345/1.1; 713/1
See application file for complete search history.

(56) References Cited

U.S. PATENT DOCUMENTS

| 5,875,293 | A  | * | 2/1999 | Bell et al. ...................... 714/27 |
| 6,522,309 | B1 | * | 2/2003 | Weber .......................... 345/1.1 |
| 6,792,452 | B1 | * | 9/2004 | Philyaw ........................ 709/217 |
| 2002/0087285 | A1 | * | 7/2002 | Chew ............................ 702/117 |

* cited by examiner

Primary Examiner—Wei Zhen
Assistant Examiner—Chih-Ching Chow

(57) ABSTRACT

A program checks for installed printers, asks the users to select printers to be tested, and then proceeds to test for communications with the printer, print spooling and driver integrity as well as the driver's appropriateness for the operating system and for language and also whether newer and more current drivers are available. A report is then presented to the user indicating the status of the printer and, if appropriate, offering the user one click installation of a repaired, more appropriate, or updated driver.

58 Claims, 7 Drawing Sheets

METHOD AND APPARATUS FOR AUTOMATING PRINTER AND PRINTER DRIVER DIAGNOSTICS AND REPAIR

COPYRIGHT STATEMENT

The present invention relates generally to the automated maintenance and repair of computer peripherals, connected to computers by a network or port, and interfaced to the computers by means of driver software. In particular, the present invention relates to a method and apparatus for diagnosing and repairing printers and printer drivers.

BACKGROUND OF THE INVENTION

1. Field of the Invention

The present invention relates generally to the automated maintenance and repair of computer peripherals, connected to computers by a network or port, and interfaced to the computers by means of driver software. In particular, the present invention relates to a method and apparatus for diagnosing and repairing printers and printer drivers.

2. Description of the Related Art

When the personal computer was first introduced in the late 1970s and early 1980s, peripheral devices, such as printers, modems, scanners, and other such devices had to be custom designed to work with every type of PC. A printer, for example, required a hardware interface that would connect with the proprietary port of a given PC or else a bus card that would interface with the particular bus design of the PC. Then, in order for programs to be able to communicate with such peripheral devices, the manufacturer of the devices had to provide special driver software that would interface either with the computer's operating system or else with particular programs.

By the 1990s, the situation had improved somewhat with the introduction of fairly standardized hardware interfaces for peripheral devices. These include the standardized Ethernet connector, which can network to many peripherals; the standardized universal serial bus port (USB port) which can also support the addressing of many different peripherals; and the modern PC parallel port, which includes a number of protocols for bi-directional communications between a PC and a peripheral standardized as IEEE Standard 1284. These have displaced almost entirely earlier ports and protocols on both Apple and IBM PC compatible computers worldwide. In addition, modern operating systems on both Apple and IBM PC computers have standardized the interface between individual programs and peripheral device driver software to such an extent that peripheral drivers, while still having to be customized to particular printers, can now have a standard interface with the operating systems which, unfortunately, still come in different incompatible varieties.

Further advances have occurred in the abilities of operating systems to enumerate the specific identities of various peripherals connected to a computer. For example, through a protocol known as "Plug-and-Play," all of the modern Microsoft Windows operating systems, starting with version 95, are now able to interrogate their various buses and portals to determine what peripheral devices are connected to a computer. Peripheral devices have also been designed to respond to such enumeration requests by not only identifying themselves, but also by identifying in some manner the driver software which they require, such that operating systems may then prompt the user to find and present the appropriate driver software for installation as part of the operating system to support the operation of each such peripheral.

All of this standardization has promoted keen competition among peripheral product designers. They may equip their peripherals with one of a very small number of hardware interfaces, and then they need merely supply driver software appropriate to the printer and matching the specifics of the operating system installed on the computer. All of this has made it fairly simple to connect up to a new peripheral device, to install its driver, and to have it operating. In most cases, a new peripheral and its driver may be installed while a computer is operating, although it may need to be restarted to complete the driver installation.

In spite of all these advances, the vendors of peripherals still find that their users have a difficult time keeping them fully operative, and accordingly numerous telephone support requests are received from customers whose printers or other peripherals are not operating properly. Of these calls, only about 10 percent result from hardware-specific problems arising because a specific printer, for example, malfunctions mechanically or electrically. The remainder relate to various software problems—about ninety percent of all calls received.

In many cases, the user's problem may be identified by performing simple tests to see if a peripheral is installed, running, and communicating with the computer. Some problems may be solved by providing the user with a newer version of a driver or by reinstalling the existing driver. In other cases, the problem may be traced to a data spooler shutdown or to the user having filled up a hard disk upon which the spooler for a printer or other peripheral is located, thereby disabling the data spooler. While skilled technicians and even many computer technicians can resolve these types of problems with little assistance, many computer owners, users, and operators lack the technical expertise to figure out how to detect and solve such problems on their own.

With respect to printers, common printer problems often fall into one of the following scenarios:

The printer was never installed properly.

The printer is not able to communicate with the PC.

The computer is using an incorrect printer driver. Typically, the customer has installed the printer but has installed an incorrect driver, one not suited for the particular printer.

The computer is using an older, outdated version of the driver. The driver vendor may have a newer version of the driver, but the customer doesn't know about this and is not benefiting from fixes and enhancements to the software.

The customer is using an incorrect driver for the operating system installed on the computer. This typically occurs when a customer upgrades to a different operating system and only then discovers that the drivers installed on the computer no longer work with the newly installed operating system.

The computer is using a printer driver having a chosen human language that differs from that of the operating system and of the user. For example, an English language driver may be installed with an operating system that is set to work in Spanish for a Spanish speaking user.

The printer driver did not successfully install completely. For example, some of its dependent files are not installed upon the PC or are otherwise damaged or incorrect.

With the Windows operating systems NT, 2000, and XP, an error may have occurred in the operating system's print spooling services, and accordingly, print jobs cannot be "spooled" because those services are no longer running.

Finally, and related to above, if the print spooling is done on a local hard drive, the disk may be overly filled, and there may not be enough hard disk space for spooling to occur.

A number of automated services are known that can assist one in detecting and correcting some of these problems. Among others, Microsoft's "Windows Update" service is now able to detect the drivers associated with the Windows 2000 and XP operating systems, to check an external database of driver updates, and to present the user with a list of suggested updated versions of driver software for installation on a computer. But other than proposing upgrades for drivers, this service does not otherwise assist in diagnosing hardware and software problems originating in peripherals, their drivers, or their connections, and in exploring and presenting possible solutions.

Hewlett-Packard has an "Instant Support" service which includes and utilizes software designed by Motive Communications. When a customer wishes this form of support, the "client" computer belonging to the customer downloads and receives a program called "Tuner" that maintains an updated set of web pages (and the like) on the customer's computer that can assist the customer with various self-service tasks as well as with seeking assistance. One embodiment of the present invention utilizes this Tuner software as one of its elements.

SUMMARY OF THE INVENTION

Briefly described, the present invention, in one embodiment, comprises an automated method for testing peripherals and their drivers. The invention comprises selecting for testing one or more peripherals which should be in communicative relationship with a computer, including at least the one peripheral residing on a network having a proxy server. The invention further comprises testing, independently of any driver, whether the computer can communicate with each selected peripheral, and reporting any communication or peripheral defects, communicating with the at least one peripheral residing on a network in a way that bypasses the proxy server; and also finding and then testing a driver corresponding to each selected peripheral, and reporting any missing or defective drivers. Then, guided by information indicating the type of each selected peripheral, the invention comprises obtaining information including the identities and versions of drivers for that type of peripheral which are available for installation, comparing this information to information indicating the identity and version of any drivers found that correspond to the same type of peripheral, and reporting any inappropriate or older version drivers. And finally, on one or more occasions when this method is practiced, the invention comprises installing one or more available drivers to replace missing, defective, inappropriate, or older version drivers.

DETAILED DESCRIPTION OF THE PREFERRED EMBODIMENTS

An embodiment of the present invention is designed to be implemented as part of an "instant support" service that is provided by a service provider that may be a printer or other peripheral device vendor, a computer vendor, an operating system vendor, to its customers. Such a service can also be offered by a third party.

A user sitting at a computer and desiring "instant support" services begins by turning on the computer's web browser and then communicating over the Internet with the web site of the service provider. The user first selects "service" and then "instant support."

In response to this selection, the host computer of the service provider (not shown) may cause a copy of the "Tuner" product of Motive Communications to be downloaded and installed on the computer, with the Tuner software being attached to an icon placed on the desktop of the computer and visible to the user. Also downloaded is at least a first set of content material, including at least a displayable web page listing various types of instant support services that may be available.

To use the "instant support" service, the user clicks on the desktop icon and then views whatever support options are available. To place this embodiment of the present invention into operation, the user then clicks on a menu entry that might read, for example, "Printer and Print Driver Diagnostics and Repair."

When the user clicks on this menu entry, the browser downloads additional pages containing additional instructions. These pages are automatically updated when necessary by the Tuner program. These pages are kept stored and available on the client computer to save time by making it unnecessary to download them in the future, and the Tuner software checks for new versions and automatically downloads them when they are available.

The present invention can also be implemented without the Tuner program. In another embodiment, it is implemented as a downloadable C++ program that is supported by HTML web pages and by a browser plug-in. Desirably, as is done with Tuner, this second embodiment retains copies of HTML/Java pages on the client computer to improve performance, but checks for updated pages with a central server and downloads them to keep the client computer up-to-date.

Figure 1:
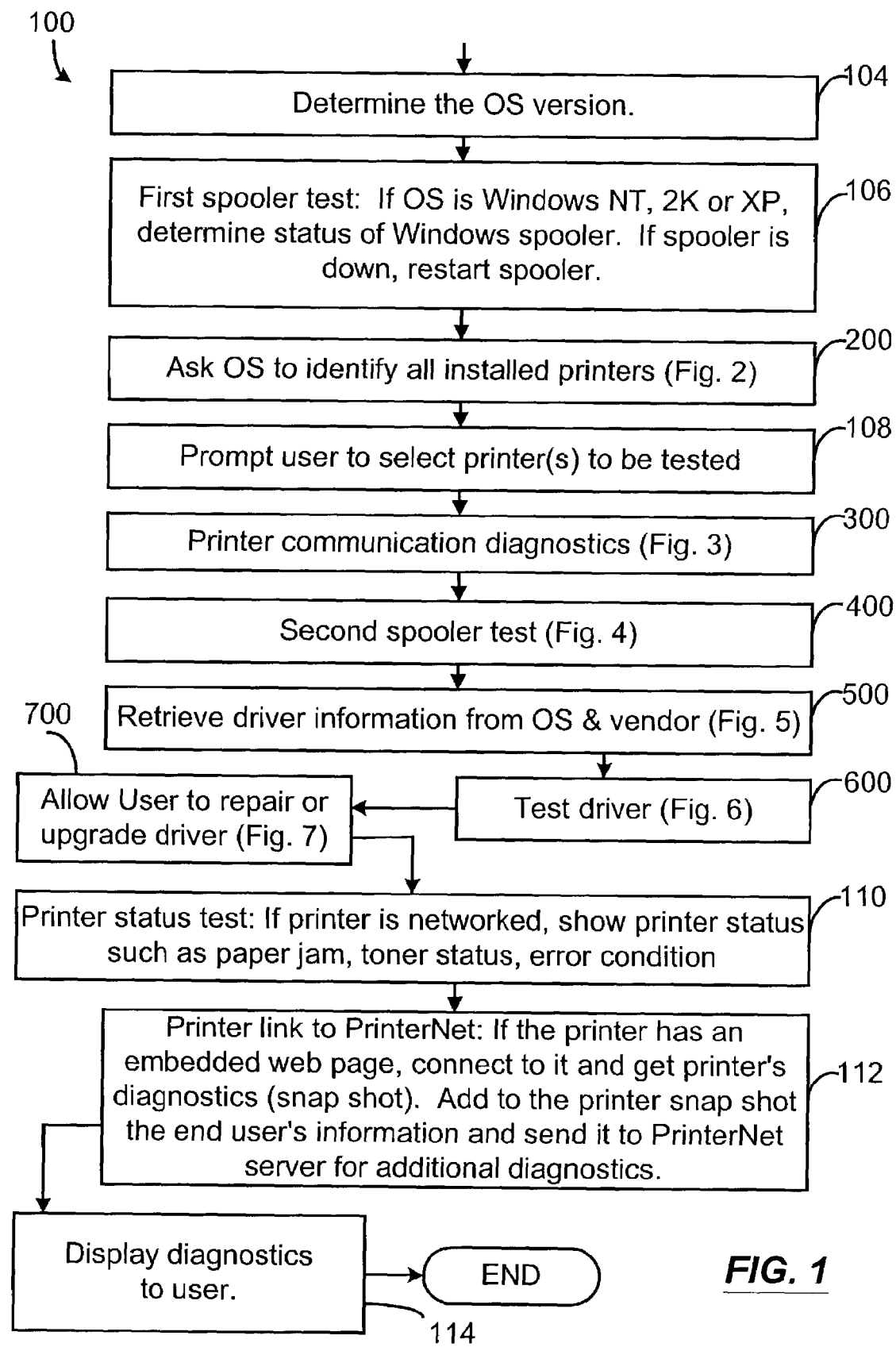
FIG. 1 presents a block diagram overview of a diagnostic and repair program in accordance with an embodiment of the present invention.

In yet another embodiment, the program illustrated in FIG. 1 and in the remaining figures can be delivered to a client computer without any "instant support" or other such accompanying service. It can be delivered pre-installed on a new computer, or it can be delivered on a CD, or it can be simply downloaded by a user wishing to gain the benefits of the invention.

In the first embodiment, a program 100 (FIG. 1), written in C++, is also downloaded and is stored on the client computer. The downloaded C++ program 100 is then automatically launched to take control of the computer and browser whenever the user selects this menu entry. This program conducts the necessary tests of hardware and software, causes the necessary pages of test result and user option information to be generated and displayed on the browser, gathers answers supplied by the user as well as data from the computer, calls for and receives peripheral driver data from a central host computer, and in general takes charge of the process of diagnosing peripherals and drivers and, where possible, instituting automatic repairs.

The operation of this program 100 is described in overview in FIG. 1. Referring now to FIG. 1, the program may be referred to as the diagnostic and repair program 100.

The program 100 begins at step 104 in FIG. 1 by calling out to the operating system to determine what version of operating system is running on the client computer. This first embodiment is designed to work with the following versions of the Windows operating system from Microsoft: Versions 95, 98, and SE, all of which are based on an older version of Windows code; and versions NT, 2000, and XP, all of which are based on a newer version of the Windows code. Windows NT, SE, 2000, and XP require a first type of peripheral device driver having a first driver interface to the operating system. Windows 95 and 98 require a different type of driver having a second driver interface to the operating system. Accordingly, drivers of the first type do not work with Windows 95 or 98, and drivers of the second type do not work with the other Windows versions. The same techniques can be applied to future versions of Windows or UNIX, provided appropriate drivers are supplied.

Having determined the operating system version, the program 100 now proceeds at step 106 to conduct a test of any spooler that is provided with the operating system to support the spooling of data for printer peripherals. Only the Windows operating system versions NT, 2000, and XP have built-in Windows spooler services. It can happen that such a Windows spooler service can encounter errors and shut itself down. If that has happened, the program 100 restarts the spooler and places it into proper operation before proceeding. At an appropriate point in time, the user may be presented with a cautionary message that the spooler was shut down and had to be restarted.

Figure 2:
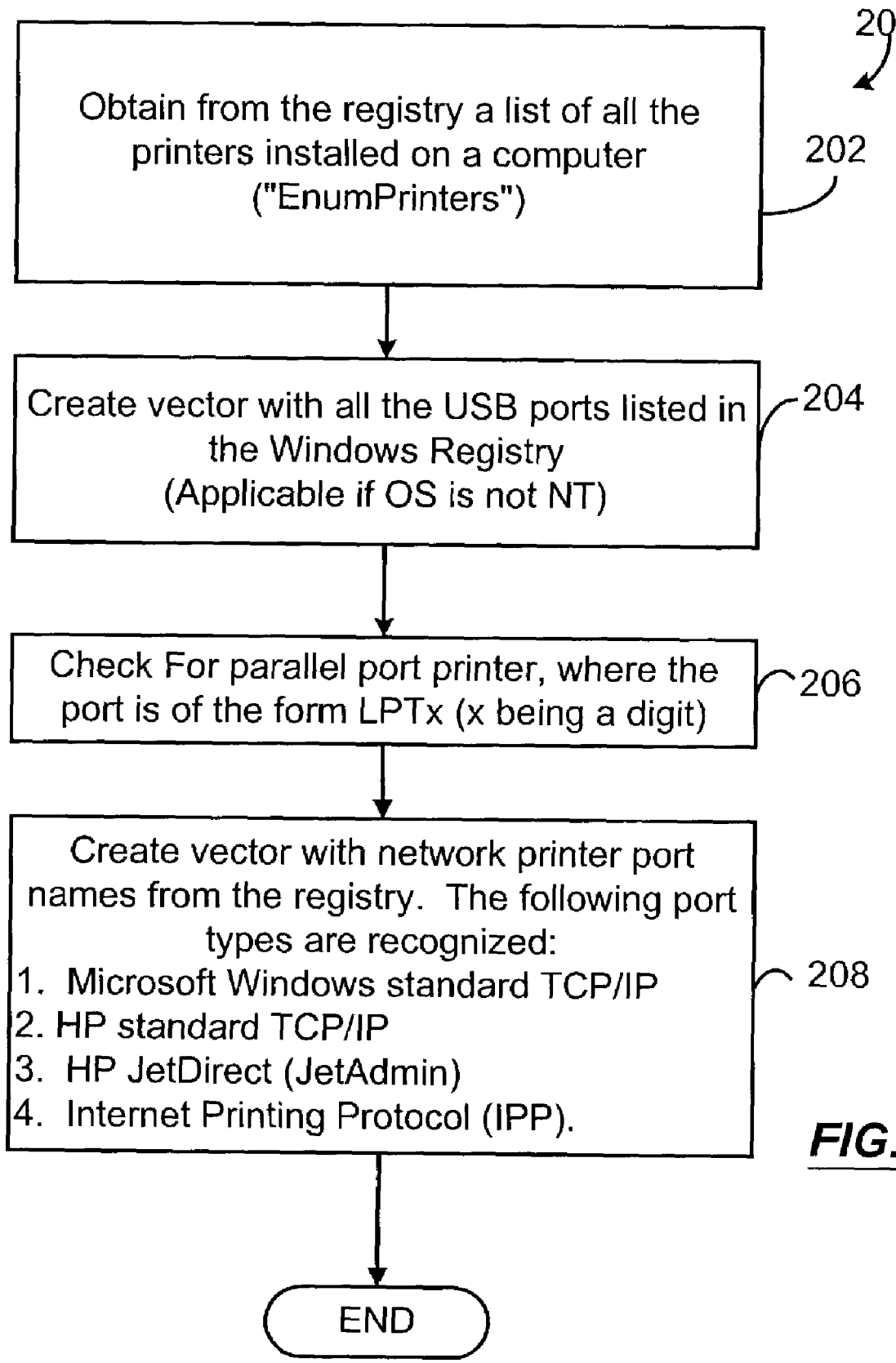
FIG. 2 presents a block diagram of a routine that asks the operating system to identify installed peripherals, in this case printers in accordance with an embodiment of the present invention.

Next, the program 100 calls upon the Windows registry to identify all of the various printers that have been attached to the computer (step 200—see FIG. 2). Then at step 108, this list of printers is presented to the user, and the user is asked to select which of the printers are to be diagnosed and, optionally, to have their drivers replaced or updated. This is done by displaying the list of printers to the user in an HTML browser page, with either check marks beside the printers or else some other way provided by which the user may indicate which of the printers are to be diagnosed. The user may elect to have all of the printers, just one printer, or selected printers checked at this time.

It may turn out that a particular printer which the user wishes to have checked does not appear in this list. If that should happen, instructions can explain to the user that the operating system registry records indicate the particular printer was never properly installed upon the computer. Accordingly, the user must at that point turn off the program 100 and complete the installation steps for that printer. A variation of the program 100 can be designed to download at this point the printer installation instructions and programs, in essence assisting the user through the process of installing the printer and its driver.

After the user has selected the printer (or printers) to be diagnosed and possibly repaired, the program 100 continues at step 300 where it performs the printer communication diagnostic test. This diagnostic test is described in more detail in FIG. 3. Briefly summarized, the program 100 actually attempts to communicate with the printer or printers, seeking them out at the local hardware port or over the network, and reporting back whether or not the computer can actually access the printer and whether it responds.

Figure 4:
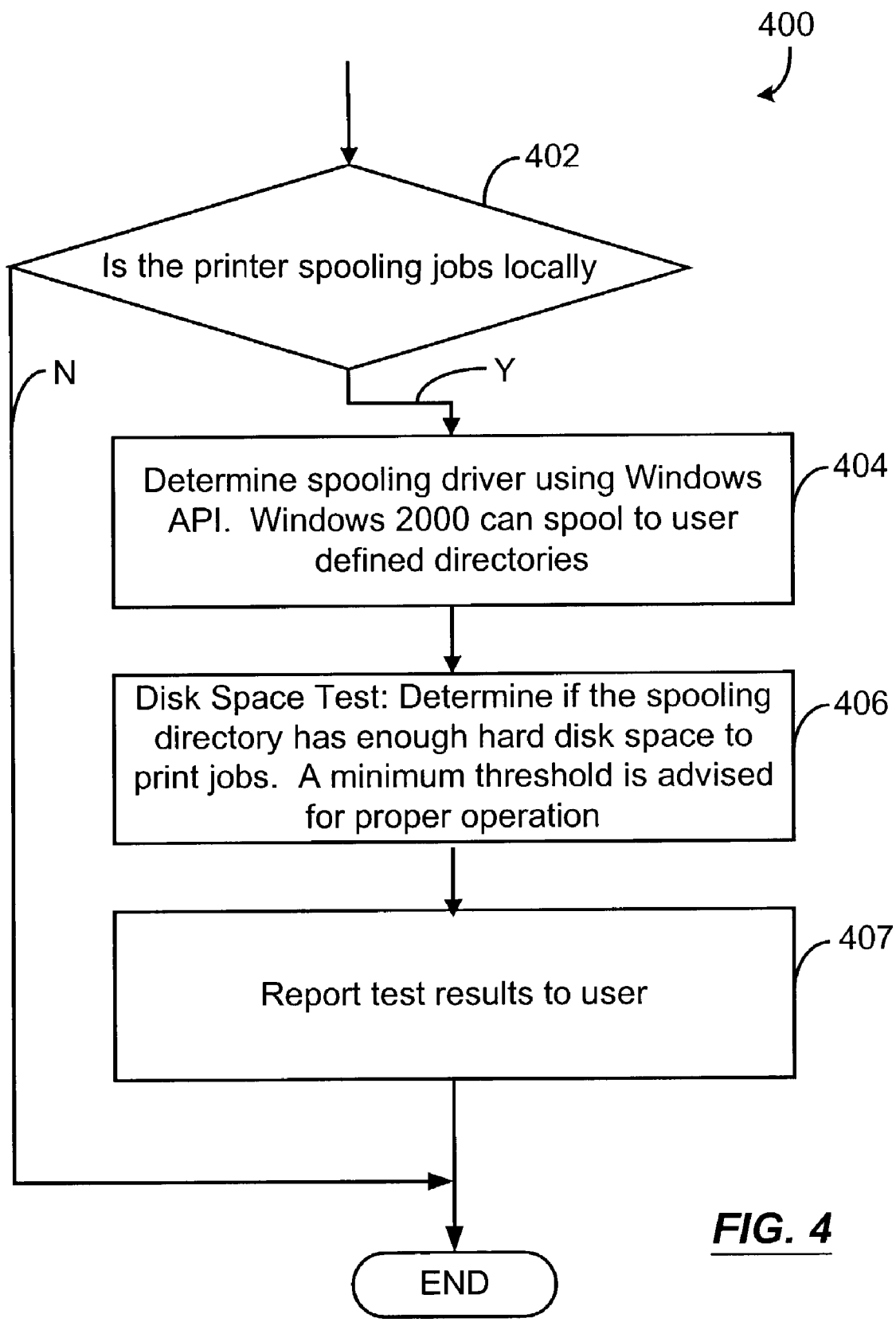
FIG. 4 presents a block diagram of a routine that tests the operating system spooler software and that also tests for drive overflow in accordance with an embodiment of the present invention.

Next, at step 400 the program 100 performs a second spooler test, the details of which are described in FIG. 4.

At step 500, the printer driver is identified, and the printer's type and other information are compared to information retrieved from a central server database which contains information about all of the possible drivers available for that particular type of printer. Then, at step 600, the driver software is tested, both to insure that it is complete and properly installed and also to check such things as the version, its compatibility with the operating system, and whether it is properly characterized as to its language to match the language of the user as indicated by the operating system.

After completion of these tests, at step 700 (FIG. 7) the user is notified of what has been found. And if there is any problem with the printer driver, the user is given the option to repair or upgrade the driver.

At step 110, and on the assumption that the communication test in step 300 succeeded, the actual status of the printer is checked out. This test reveals error conditions such as paper jams, low toner, and other simple hardware-related error conditions that may be causing a printer not to perform properly and that a user typically can correct.

At step 112, if the printer is a sophisticated and modern one having a built-in, embedded web page or series of web pages, then the program 100 connects with the printer and obtains a web page presenting a snapshot of the printer's actual diagnostics. This snapshot may be appended to the end of the information gathered during the previous tests. Information may also be sent on to a PrinterNet server, where additional diagnostics may be performed and results returned indicating the condition of this particular printer. This type of testing can be much more sophisticated.

Figure 7:
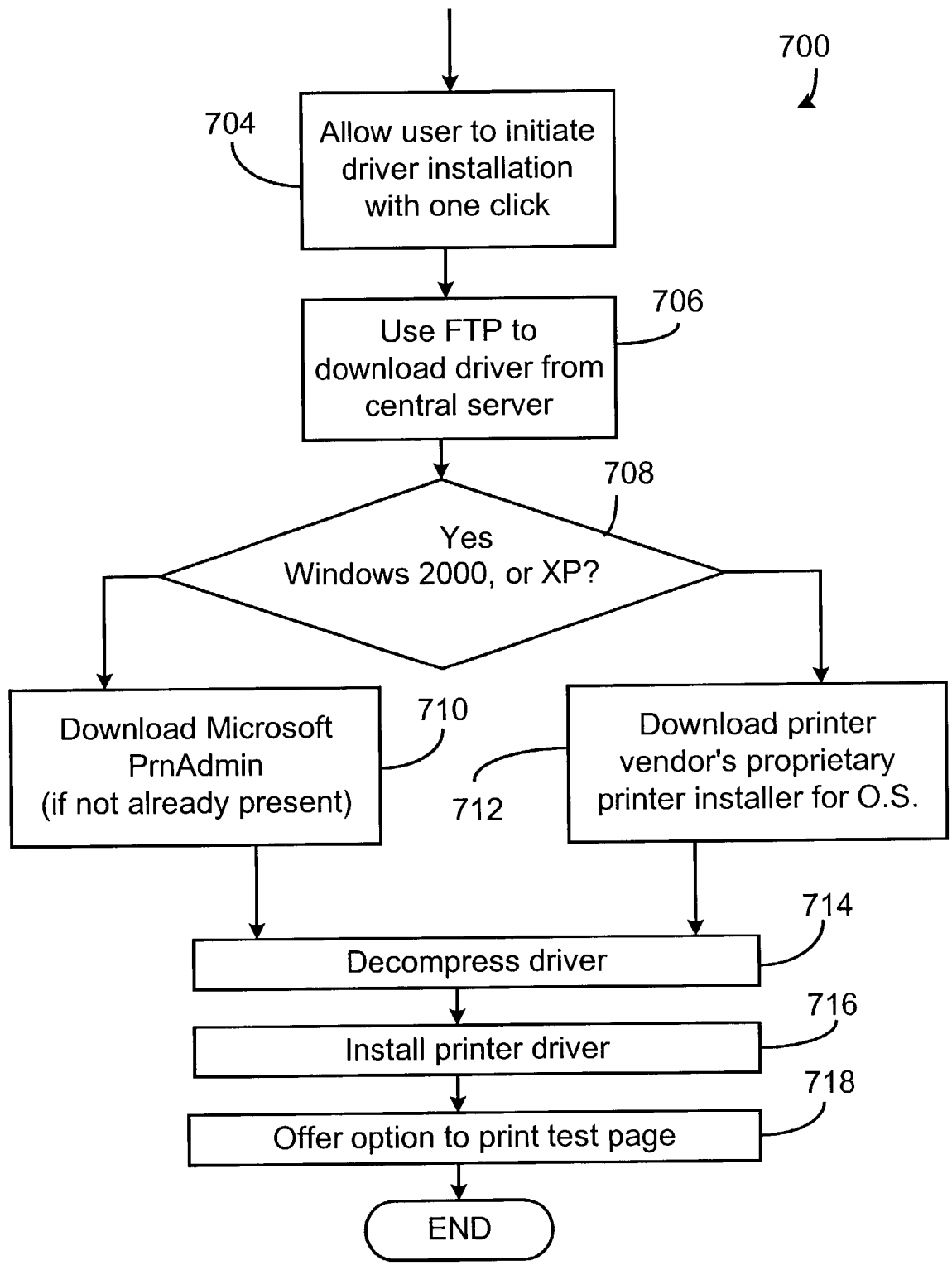
FIG. 7 presents a block diagram of a routine that allows a user to repair or upgrade driver software in accordance with an embodiment of the present invention.

If the user elects to download and install a new driver, then at step 700, the program 100 proceeds to do so, proceeding as indicated in FIG. 7.

Referring now to the remaining figures, FIG. 2 presents at 200 the routines which ask the operating system to identify all installed printers and identify their addresses for testing. All printers have names and also port names. Parallel port printers have port names of the form "LPTx", where "x" is a digit. USB printers are registered as such on the computer. Peer to peer networked printers have a "port monitor" which is software that routes print jobs to the network printer at a particular TCP/IP port (or socket) number, usually port or socket number 9100. "Client/Server" printers, accessed through a print server, may have a port monitor; but if they do not, then the port name may be of the form "\\<server_name>\<printer_name>". Either the "<printer_name>" portion of the port name or the printer's actual name may be registered with a domain name server, which can be prompted to supply an IP address for such a printer.

First, at step 202, an API (application programmer's interface) call is made to retrieve all printer information from the Windows registry, where all installed printers are registered during their installation process. This call to identify all the printers is "EnumPrinters," a call which returns information concerning every printer installed on a given computer, including each printer's assigned name and assigned port name.

The remaining steps shown in FIG. 2 may be performed after step 106 (FIG. 1), where the user is asked to identify which printers are to be tested.

Next, at step 204, all USB port printers are identified. These printers were installed on the computer's USB port, so a record of each of them is contained in the USB registry. A vector is created that contains all of the USB or Universal Serial Bus printers that are listed in the Window's registry. However, this cannot be done if the operating system is Windows NT, which does not support USB port printers in this manner. The program "GetUSBPortMonitors( )" which performs this USB printer enumeration task is set forth in Appendix B.

Then, at step 206, a check is made of printer port names for any parallel port printers, which are identified by having a port name in the form of "LPT1," "LPT2," "LPT3," or a like port name beginning with the letters "LPTx" (sometimes with a colon), a standard established in the early days of Microsoft's MS/DOS operating system.

Finally, at step 208, an attempt is made with reference to the registry to identify the remaining printers as network printers accessible over a local area network. First, a second vector is created to enumerate any port monitors set up for network printers. This is accomplished by a registry call for all entries under HKEY_LOCAL_MACHINE\SYSTEM\CurrentControllerSet\
Control\Print\Monitors On the assumption that the routine 200 is searching for Hewlett Packard network printers, in the registry four different types of port monitors are queried from the registry subdirectory identified above: First, Microsoft's Standard TCP/IP port monitor; secondly, Hewlett Packard's TCP/IP port monitor; thirdly, Hewlett Packard's Jet Admin port monitor; and finally, Internet Printing Protocol (IPP) port monitor. Other monitors can also be added in different embodiments, possibly including some supporting other brands of printers.

For each printer port monitor found under these recognized Port Monitor providers, the following data is retrieved and is added to the second vector: (1) IP address, (2) host name, and (3) SNMP community name. If the IP address of a printer is not available from the registry (step 310 in FIG. 3), then the Domain Name Server (DNS) is queried to check whether the host name can be resolved into an IP address (step 312). If all of this fails, then the user may be asked to provide an IP address (step 314).

If no monitor is found for a printer, then the printer's port name and printer name are examined to see if any of the names conforms with the UNC (universal naming convention) and is of the form "\\<server>\<host_name>". If the <host_name> corresponds to a UNC name formatted as shown, then the <host_name> portion is extracted and submitted to a domain name server to see if a corresponding IP address is available (step 312). If all of this fails, then the user may be asked to provide an IP address (step 314).

This task is complicated by the fact that one is dependant upon operating system registry data concerning these printers, and there are no definite standards concerning how printer monitors on a network should be registered—some installation programs make different entries into the registry than do others, and some may also place the data into different locations.

This embodiment of the invention is designed to recognize four different types of registry entries. These must be identified, distinguished from each other, and then accessed in different ways to determine the network addresses of the installed network printers.

First, if the network printer was installed using the Microsoft TCP/IP port monitor, the pertinent part of the monitor data will be placed within a folder labeled with the name of the port. That folder will be placed within another folder named "Ports". And the "Ports" folder will be enclosed within the "Standard TCP/IP Port" folder. For each new port added to the computer, a like subfolder named with the port name is created that contains the port configuration data.

Microsoft "Add Printer" utility present on all Windows operating systems is a Microsoft installer, and it usually uses the Standard TCP/IP port monitor during the installation of network printers.

Second, if a printer was installed using a Hewlett Packard "TCP/IP Port Monitor" installer that comes with many Hewlett Packard printers, then essentially this same protocol is followed, with one change: ports added to the computer by Hewlett-Packard's installer are contained within a "HP TCP/IP Port Monitor" folder within the registry's "Monitors" subfolder.

Third, if the printer was installed using Hewlett Packard's JetAdmin software, which provides its own port monitor, the JetAdmin port installation creates a subfolder within the "Montiors" subfolder named "HP JetDirect Port" that contains a "Ports" folder which contains information for each new port added to the computer, as in the above arrangements. Each printer port is assigned a default name created by JetAdmin, such as "NPIO4AD5E".

In the case of the JetAdmin monitor, the port configuration data for each printer is different. The data may identify, among other things, the printer's IP address, but not as an isolated value, as with the monitors described above. The IP address, if present, appears within a string named "HPNetowrkPrinterID". But the address within this string is a TCP/IP address only if the string is of the form "TCP/IP=<address>" This print monitor may support another networking protocol, such as IPX, and in that case the string would be of the form "IPX=<address>", and the address would not be an IP address usable by the present embodiment of the invention to find and test the printer. Accordingly, all strings beginning with some prefix other than "TCP/IP=" are ignored by this embodiment of the invention. A different embodiment designed to work with several different networking protocols might contact network printers using such other network protocols guided by such information.

A fourth class of installer is an industry standard Internet printing Protocol (IPP) installer. This type of installer is typically built into a printer-generated web page. The user or system administrator, knowing the printer's IP address, used a browser to call up this web page, and the web page ran a Java applet that installed the printer and its driver on the computer. In this case, the port monitor is found within a folder called the "Internet Printer Connection Port". For each new port added using this protocol, a key is added to the registry called "URL" which contains the URL of the printer. This can be translated into an IP address by the domain name server.

Figure 3:
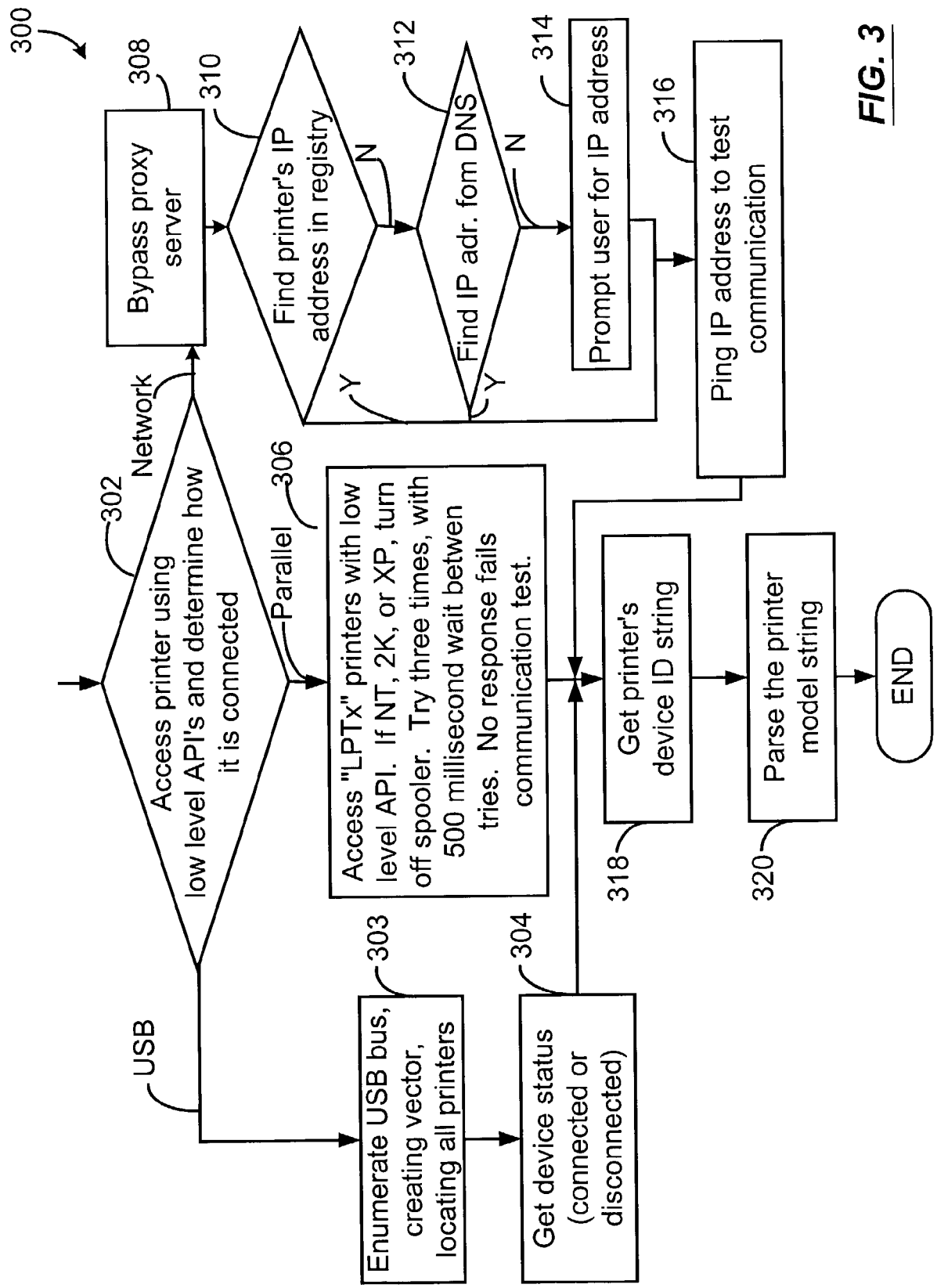
FIG. 3 presents a block diagram of a routine that tests the communications between a printer and the operating system of a computer in accordance with an embodiment of the present invention.

FIG. 3 presents the routine that performs printer communication diagnostics tests after a user has selected one or more printers to be tested at step 108 in FIG. 1. (Some steps in FIG. 3 were described in conjunction with the description of FIG. 2 presented above.)

The routine 300, at step 302, determines whether each printer to be tested is a network or TCP/IP printer, a USB printer, or a parallel port printer in the manner explained above. Then the routine uses low-level application programmer interface calls into Windows to access the printer and to test it.

If the printer is listed in the vector of USB bus printers, then at step 303 the program 100 calls for a complete USB enumeration of all the devices connected or attached to any and all of the USB buses associated with the computer. This enumeration request should locate each USB printer which the registry indicated was located on the USB bus. If it fails to do so, then this signals the presence of some form of hardware discontinuity, such as the printer not being turned on, not being plugged in, or not being connected to the computer. It may also signal a defective USB cable or plug or interface. This information is noted for later presentation to the user. If a printer is located, then the enumeration command reports the status of the printer and its device ID string at step 304. The "status" is "connected" or "disconnected."

In the case of one or more parallel port printers, any and all parallel port printer devices which the registry indicates are attached to printers are accessed (step 306) with a low-level application programmer interface call (DeviceIOControl). If there is no response to this call, the call is repeated up to two more times after half second delays. If there is still no response, then again it is assumed that the parallel port printer is either inoperative or not connected properly to the printer's parallel port, or the cable or the parallel port itself may be defective. If the printer does respond, then its device ID string is recovered.

In the case of a network printer, first, to speed up considerably communications with such printers, any proxy server is bypassed (step 308) so that messages are sent to printers on the inside of the company's firewall. At step 310, an attempt is made to detect through the registry the printer's IP address (as explained above). If an IP address is not available, then an attempt can be made to obtain an IP address from the domain name server, as was explained above (step 312). Also, SNMP can be used to try and obtain the printer's IP address and/or device ID string. If all of these efforts are unsuccessful, then the user may be prompted to provide an IP address for the printer (step 314). In any case, the physical connection of the printer to the computer is tested out at step 316 by simply "pinging" the printer's IP address in the standard manner, to see if the ping address is echoed back by the printer to indicate full communication is available.

In any event, the device ID string (the 1EEE-1284 parallel port identification string is used in this embodiment for all printers, no matter what connection they use) is obtained at step 318, and it is parsed to locate the printer model string at step 320. This string is later used to identify the printer when searching for its drivers.

Note that the printer's active driver is bypassed and is not involved in this test of printer communications.

With reference to FIG. 4, the second printer spooling test is set forth. First, at step 402, a check is made to see that the spooling is being done locally, on the client computer being tested, rather than remotely on some server, as is done in many networked environments. If there is no print spooling, or it is not being done locally, then the routine 400 terminates. Otherwise, the Windows application programmer interface is used to determine the spooling driver and where the print spooling is being done and on what hard drive (step 404). In the case of Windows 2000 and 2000 XP. Having located the spooler directory, at step 406 a disk space test is carried out to determine if there is enough room in the spooler drive to contain print jobs. A minimum threshold of space is advised for proper operation. If there is not sufficient room, typically due to the user placing too many files on that particular hard drive or volume, then a fault or defect indication is signaled. The result of this test is returned to the user at step 407 at an appropriate time.

The routine 500 retrieves information about the driver software both from the operating system and also from a server maintained by the printer vendor or some other provider. First, at step 502, a determination is made of which operating system version is in use. As noted above, print drivers for Windows 95 and 98 are entirely different from print drivers for Windows NT 2000, XP and ME; and even within these families of operating systems, a given driver may be certified for use with one operating system version and not with another.

A test is made at 502 as to which operating system is present on the computer. If Windows 95 or 98 is found, then at step 506 driver information is obtained using the specific application programmer interface calls for those versions of Windows. Otherwise, at step 504 the driver information is read using Windows 2000 A.P.I. calls. The information identified by these calls is indicated at step 508 to include information about the driver's configuration file, the driver's data file, the driver's environment string, and the driver's operating system string. In addition, at step 510, the driver's data file is opened, and the operating system is called upon to report the driver data file's last update date and time, the date when that file was last written to. At the same time, a check is made to insure that all the component files of the driver exist and are not of zero length. Any discrepancy is later reported to the user at step 704 in FIG. 7.

This is done because the manner of keeping track of versions for printer drivers has not been consistent over time. While other driver files may be shared, a driver's data file is typically unique to one printer and is not duplicated nor likely to have been overwritten. Accordingly, the creation date and time of the driver data file is used as a substitute version number.

Having identified the driver and its "last modification of the data file" version number, the program 100 creates a query string at step 512 which it sends to the printer vendor's (or other provider's) server. In the case of Hewlett Packard, this query string is directed to a data base named iADD installed on a server maintained by Hewlett Packard. The query is sent to the server in the form of an HTTP web page request directed to a server-based database, with parameters appended to the request that include the printer model (extracted from the 1EEE-1284 device ID string), the operating system's identity, and the operating system's language (English, French, etc.) At step 512, this query string is sent to the iADD server. The iADD data base then returns an XML file formatted as is shown in Appendix A that contains information describing all of the drivers available for that particular printer model or type.

The information returned, as indicated in Appendix A, identifies all the drivers available for that particular printer model from the printer vendor, the dates when their data files were last written to (to serve as a substitute version number), the operating system they are designed to work with, and the language (English, French, etc.) that they are compatible with. Other information may also be included, as is indicated in Appendix A.

Figure 6:
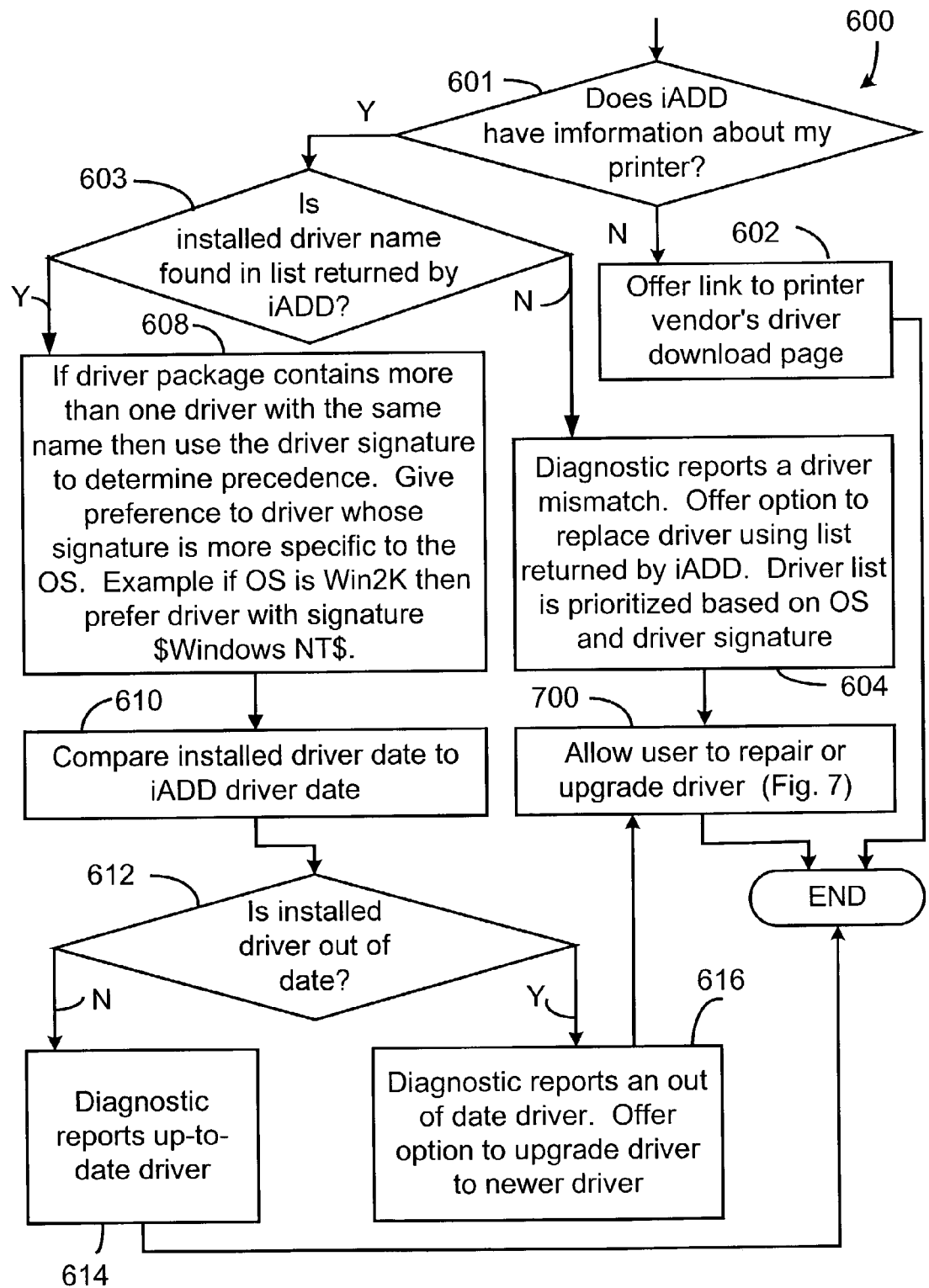
FIG. 6 presents a block diagram of a routine that tests driver software in accordance with an embodiment of the present invention.

FIG. 6 discloses the details of the driver test routine. This routine begins at step 601 by checking to see if any information about drivers for this particular model or type of printer was obtained from the vendor's iADD server database. If not, then at step 602, the program 100 finds and offers to the user a link to the printer vendor's "driver download" web page for that particular printer model or type, thereby permitting the user to select a driver manually and to complete the download process semi-manually by going to the vendor's web site, making a driver selection, downloading it, and then having it installed it in the usual manner.

If information about drivers for the printer model or type was found, then program control continues at step 603. At this step, the name of the driver installed on this computer is compared to the names of the drivers in the database for that printer. If this driver name does not appear in any of the database entries for this model or type of printer, then it is likely that an improper driver is installed, not one designed for this particular printer. It may also possibly be a "default" driver provided by the operating system which may be acceptable, but which may not have all of the desired capabilities nor support all of the available features of the printer. For example, the driver may not communicate with the printer bidirectionally. In any event, at step 604, a driver mismatch is reported, and at step 700 (FIG. 7) the user is offered the option of replacing the driver installed on the computer with one chosen from the list returned by the print vendor's database. The list of drivers is prioritized based upon the compatibility of the operating system or systems specified for the driver (the operating system compatibility is indicated by the driver's "signature") with the operating system installed upon the computer. For example, a Windows 2000 driver might be selected for use with Windows XP if no Windows XP driver was available, since the drivers for those two operating systems are generally considered to be compatible.

If the presently installed driver is found in the list, then program control branches from step 603 to step 608. At this step, if more than one driver exists for this printer, then the driver's operating system signatures are examined to determine their precedence. Preference is given to the driver whose operating system specification in the signature is more specific, or closer in compatibility, to the operating system installed on the computer. For example, if the operating system on the computer is Windows 2000, then a driver with a Windows NT signature would be preferred over drivers with signatures for Windows 95 or 98.

At step 610, the date of the data file associated with the installed driver is compared to the dates of the drivers selected from the vendor's database. At step 612, if the driver is not out of date but is current, then this fact is reported at step 614. Otherwise, at step 616, the diagnostics report an out-of-date driver and offer the user the option to upgrade to a newer driver. In either event, program control then continues at step 700 in FIG. 7 where the user is permitted to repair or upgrade the driver.

With reference to FIG. 7, at step 704, a report on the driver is presented to the user along with any options, as indicated in the routine 600 presented in FIG. 6. The user is then permitted to initiate the installation of a new driver with a single click of a mouse button.

If the user elects to install a new driver, then at step 706, The internet's standard FTP function (File Transfer Protocol) is used to download a driver from the vendor's central server. The driver's FTP internet address was included in the material returned from the vendor's iADD database in an XML data structure. (See Appendix A).

Having downloaded the driver, at step 708 it is necessary to download, or check for the presence of, suitable driver installation software. In the case of Windows XP or Windows 2000, installation software for the driver is included as part of the Microsoft operating system. A check is made to see if the Microsoft program PrnAdmin is present on the machine. If not present, then at step 710 this Microsoft program is downloaded. In the case of older versions of the Windows operating system, the vendor's proprietary printer installer for that operating system is downloaded at step 712, if it is not already present. Next, at step 714, the driver is decompressed. At step 716, the appropriate installer is called upon to install the print driver into the operating system. And finally, at step 718, the user is invited to print a test page to insure that everything is working properly.

The embodiments of the invention described above describes diagnosing printers and diagnosing, replacing, or upgrading their drivers. Other embodiments can be designed to support other types of peripherals and their drivers, with the peripherals connected to a computer in different ways than those described above. For example, the invention can be applied to peripheral scanners, memories, cameras, displays, microphones, speakers, modems, and other types of peripherals requiring either third party or operating system drivers. As other examples, in addition to parallel ports, USB ports, and Ethernet ports, the invention can apply to peripherals connecting to a computer by means of serial ports, IEEE 1394 ports, wireless (IEEE 802 and Bluetooth, for example) ports, SCSI ports and IDE ports, PCMCIA ports, and to peripherals that plug directly into a system bus, such as an ISA or PCI bus, or to peripherals that connect to cards plugging into these and other comparable busses.

While a preferred embodiment of the invention has been shown, those skilled in the art will recognize that numerous modifications and changes may be made without departing from the true spirit and scope of the invention as defined in the claims annexed to and forming a part of this specification.

APPENDIX A

Figure 5:
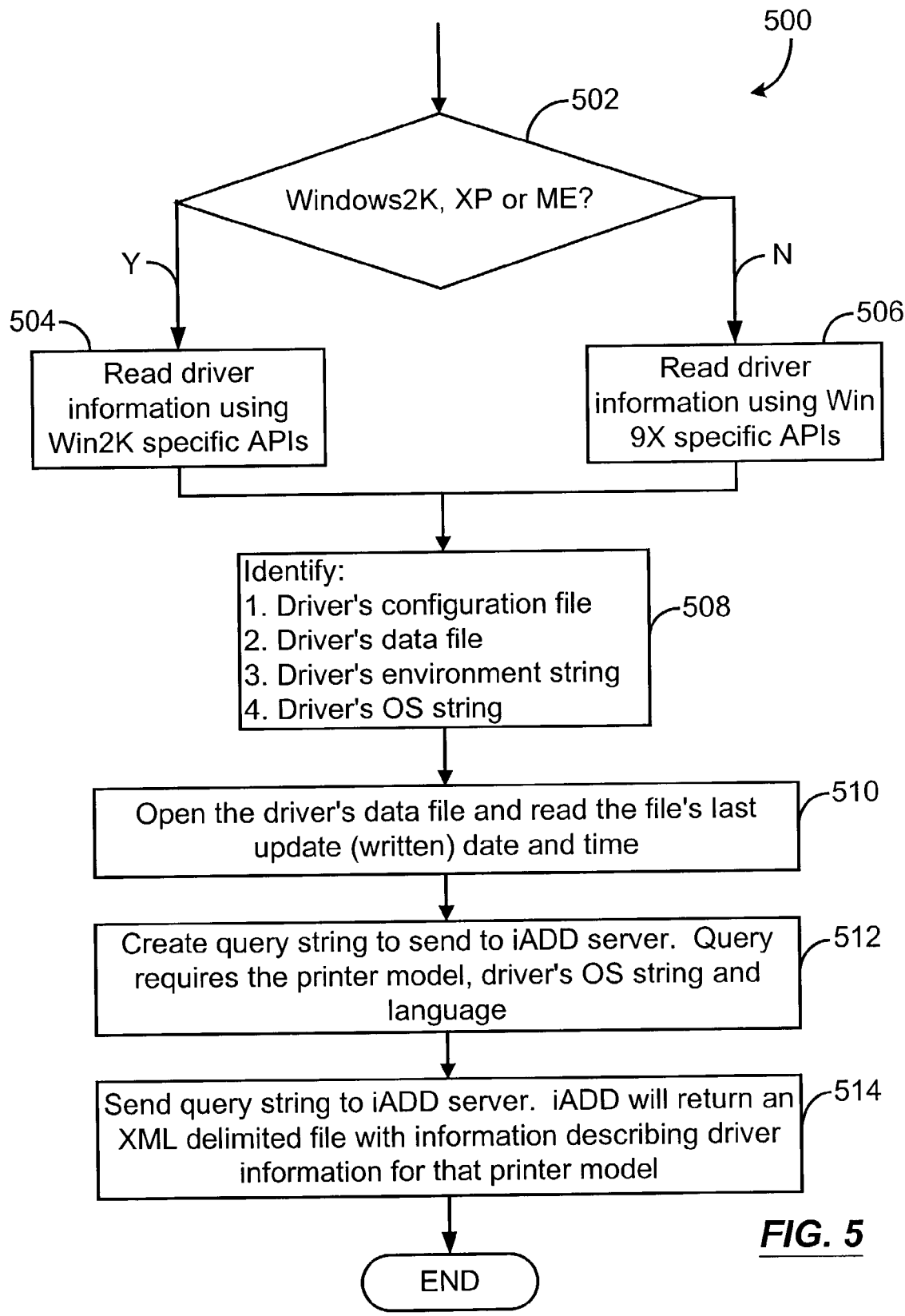
FIG. 5 presents a block diagram of a routine that retrieves driver information from the operating system as well as from a server maintained by a peripheral device vendor, a computer vendor, or other such party in accordance with an embodiment of the present invention.

XML MESSAGE RETURNED BY IADD DATABASE (step 514, FIG. 5)

1. Data Structure of XML Message
```
<?xml version="1.0" encoding="UTF-8"?>
<product basepart="lnnn">
     <attribute_file_specification>2.2</attribute_file_specification>
     <attribute_author_email>buid_errors_spo@iadd-
server.ipssources.com</attribute_author_email>
     <driver name="XXXX">
          <alias>XXXX</alias>
          ...............................
          <alias>XXXX</alias>
```

APPENDIX A-continued

XML MESSAGE RETURNED BY IADD DATABASE (step 514, FIG. 5)

```
            <model>XXXXX</model>
            ...............................
            <model>XXXXX</model>
            <lang>LANG_XXXXX</lang>
            ...............................
            <lang>LANG_XXXXX</lang>
            <date>mm/dd/yyyy</date>
            <version>X</version>
            <os platform="Windows_XXXXX" name="XXXX">
                <network_compatible>X</network_compatible>
                <installation_method>X</installation_method>
                <primary_inf>X</primary_inf>
                <storage_format>X</storage_format>
                <digital_signature>X</digital_signature>
                <monolithic_install>X</monolithic_install>
                <additional_install>X</additional_install>
                <prerequisites>X</prerequisites>
                <functionality>X</functionality>
                <improvement>X</improvement>
                <knownIssues>X</knownIssues>
                <reserved></reserved>
            </os>
            <os platform="Windows_XXXXX" name="XXXX">
            ......
            </os>
    </driver>
    <driver name="XXXXX">
    .....
    </driver>
</product>
2. Example of an XML Message
(Copr. 2002 Hewlett Packard Company)
<?xml version="1.0" encoding="UTF-8"?>
<product basepart="lj616">
    <attribute_file_specification>2.2</attribute_file_specification>
    <attribute_author_email>build_errors_bpd@iadd-
server.ipssources.com</attribute_author_email>
    <driver name="HP LaserJet 5Si Mopier PS">
        <alias>HP LaserJet 5Si Mopier PostScript</alias>
        <alias>HP LaserJet 5Si/5Si Mopier PS</alias>
        <lang>SUBLANG_CHINESE_TRADITIONAL</lang>
        <lang>LANG_DANISH</lang>
        <lang>LANG_DUTCH</lang>
        <lang>LANG_ENGLISH</lang>
        <lang>LANG_FRENCH</lang>
        <lang>LANG_GERMAN</lang>
        <lang>LANG_HUNGARIAN</lang>
        <lang>LANG_ITALIAN</lang>
        <lang>LANG_POLISH</lang>
        <lang>LANG_PORTUGUESE</lang>
        <lang>LANG_NORWEGIAN</lang>
        <lang>LANG_FINNISH</lang>
        <lang>LANG_SWEDISH</lang>
        <lang>LANG_TURKISH</lang>
        <model>HP LaserJet 5</model>
        <model>HP LaserJet 5M</model>
        <model>HP LaserJet 5P</model>
        <model>HP LaserJet 5MP</model>
        <date>02/01/2001</date>
        <version>1.0</version>
        <os platform="Windows_NT_4" name="Windows NT">
            <network_compatible>1</network_compatible>
            <installation_method>INF</installation_method>
            <primary_inf>ntprint.inf</primary_inf>
            <storage_format>WinZip</storage_format>
            <digital_signature>0</digital_signature>
            <prerequisites>0</prerequisites>
            <reserved1></reserved1>
        <functionality>This driver supplies all the Mopier printing functionality to Windows NT
        4.0</functionality>
        <improvement>Added support for duplexing and improved paper handling options.
        </improvement>
        <knownIssues>None</knownIssues>
        </os>
        </driver>
        <driver name="HP LaserJet 5Si Mopier PS">
        <lang>SUBLANG_CHINESE_TRADITIONAL</lang>
```

APPENDIX A-continued

XML MESSAGE RETURNED BY IADD DATABASE (step 514, FIG. 5)

```xml
            <lang>LANG_DANISH</lang>
            <lang>LANG_DUTCH</lang>
            <lang>LANG_ENGLISH</lang>
            <lang>LANG_FRENCH</lang>
            <lang>LANG_GERMAN</lang>
            <lang>LANG_HUNGARIAN</lang>
            <lang>LANG_ITALIAN</lang>
            <lang>LANG_POLISH</lang>
            <lang>LANG_PORTUGUESE</lang>
            <lang>LANG_NORWEGIAN</lang>
            <lang>LANG_FINNISH</lang>
            <lang>LANG_SWEDISH</lang>
            <lang>LANG_TURKISH</lang>
            <model>HP LaserJet 5Si Mopier</model>
            <date>02/01/2001</date>
            <version>1.0</version>
            <os platform="Windows_NT_4" name="Windows NT">
            <network_compatible>1</network_compatible>
            <installation_method>INF</installation_method>
            <primary_inf>ntprint.inf</primary_inf>
            <storage_format>WinZip</storage_format>
            <digital_signature>0</digital_signature>
            <multi_directory>0</multi_directory>
            <prerequisites>0</prerequisites>
            <functionality>This driver supplies all the Mopier printing functionality to Windows NT
            4.0</functionality>
            <improvement>Added support for duplexing and improved paper handling options.
            </improvement>
            <knownIssues>None</knownIssues>
            <reserved1></reserved1>
            </os>
        </driver>
        </driver name="HP LaserJet 5Si/5Si MX PS">
            <model>HP LaserJet 5Si</model>
            <model>HP LaserJet 5Si MX</model>
            <date>02/01/2001</date>
            <version>1.0</version>
            <os platform="Windows_NT_4" name="Windows NT">
            <network_compatible>1</network_compatible>
            <installation_method>INF</installation_method>
            <primary_inf>ntprint.inf</primary_inf>
            <storage_format>WinZip</storage_format>
            <digital_signature>0</digital_signature>
            <prerequisites>0</prerequisites>
            <functionality>This driver supplies all the Mopier printing functionality to Windows NT
            4.0</functionality>
            <improvement>Added support for duplexing and improved paper handling options.
            </improvement>
            <knownIssues>None</knownIssues>
            <reserved1></reserved1>
            </os>
            <os platform="Windows_2000" name="Windows 2000">
            <network_compatible>1</network_compatible>
            <installation_method>INF</installation_method>
            <primary_inf>ntprint.inf</primary_inf>
            <storage_format>WinZip</storage_format>
            <digital_signature>1</digital_signature>
            <prerequisites>0</prerequisites>
            <functionality>This driver supplies all the Mopier printing functionality to Windows NT
            4.0</functionality>
            <improvement>Added support for duplexing and improved paper handling options.
            </improvement>
            <knownIssues>None</knownIssues>
            <reserved1></reserved1>
            </os>
        </driver>
</product>
```

3. Tag Definitions in XML Message product basepart= <string>

Purpose: Opening tag for an attribute file. The basepart is essentially a part number for the compressed driver files that are stored on the ftp site. Usually baseparts begin with a two letter identifier like "lj", "dj", "bi", etc. What follows is a 3 or 4 digit number that is arbitrary and not intended to match the product in any way. The basepart provides the key for I-ADD to match up the attribute data to the data stored in the TOAD (or in the future the SOAR) database.

Source: The basepart is allocated by the product division in advance of creating the attribute file. CSSO is the division that gives out the baseparts. Usually the baseparts are assigned by a technical marketing engineer in the product division.

APPENDIX A-continued

XML MESSAGE RETURNED BY IADD DATABASE (step 514, FIG. 5)

Example: "lj101", "dj989", "bi103"
Status: Required.
attribute_file_specification <string>
Purpose: Identifies the XML schema revision. Version 1.0 was the original definition. This document
contains version 2.2 with family driver support. This field is intended to help parsers handle differing file
versions if necessary. The current value is 2.1.
Source: Dictated by the I-ADD Attribute Specification document (this document).
Example: 2.2
Status: Required.
attribute_author_email <string>
Purpose: Identifies the CDP email address for notifying the product divisions of build errors. This will be
used to help in resolving problems with attribute files.
Source: The IADD Driver Attributes schema document kept under the IAdd Server project in CDP.
Current values are:
build_errors_bpd@iadd-server.ipssources.com
build_errors_pls@iadd-server.ipssources.com
build_errors_spo@iadd-server.ipssources.com
build_errors_vcd@iadd-server.ipssources.com
Example: build_errors_bpd@iadd-server.ipssources.com
Status: Required.
driver name=<string>
Purpose: The beginning of a subsection. The name attribute on the <driver> tag is the name of the
driver as it would appear to the user running the Microsoft Add Printer Wizard (also as listed in the
driver inf file if one exists). This string will be available to be presented to the user to choose a driver.
In the event of a family driver, multiple <driver> tags can occur. Between the <driver> and </driver>
tags goes all the attributes for this driver. Some divisions call this the "friendly name". This value will be
used by installers to pick the correct driver out of an inf file. Therefore it is imperative that this
string be correct including case sensitivity.
Source: Comes from the inf file.
Example: HP LaserJet 4050 Series PCL 5e
Status: Required.
NOTE: Between the <driver> tag and the <os> tag, the order of the following tags must be maintained.
So the order must be: <alias>, <lang>, <model>, <date>, and <version> (the alias tag can be left out if
not needed).
alias <string>
Purpose: Provides for the tracking of old names a driver may have been known by. Over time different
naming conventions may be adopted. A new release of an existing driver may go by a new name. If a
version is part of the driver name then a new alias would be created each time that version number
changed. Applications looking for an update to an existing driver will need these values to find the latest
driver.
Source: Each time the driver name is changed, the previous name should be added as an alias.
Example: HP LaserJet 4050 Series PCL 6 v1.0
Status: Optional.
lang <string>
Purpose: This set of strings represents the languages supported by the driver. Some languages, such
as Chinese, also have sub languages associated with them. The legal set of language values is found
in Appendix A. The Microsoft language naming convention is being used. These names will be
matched up with what is kept in TOAD/SOAR and do not need to match the language strings shown on
the Web pages. In the event a sub language is being specified, a value from appendix B should be
used.
Source: Dictated by Appendix A and B.
Example: LANG_ENGLISH, LANG_FRENCH, SUBLANG_CHINESE_TRADITIONAL
Status: Required.
model <string>
Purpose: This is the name of a device model, as returned in the device ID model sub string, that is
supported by the driver. Most drivers support more than one device model. This set of <model> tags
provides a definitive list of devices supported by this driver. There should be as many <model> tags as
there are supported models. This value will be used to lookup matching drivers in the I-ADD backend.
Therefore it is imperative that this string be correct including case sensitivity.
Source: Comes from the printer firmware. Product divisions should obtain this value from their firmware
teams. Tools like the Install Network Printer Wizard will also display this value after the device has
been discovered.
Example: DESKJET 990C, HP LaserJet 4050 Series
Status: Required.
date <mm/dd/yyyy>
Purpose: A date string that matches the date of one of the data files covered in the source section
below. This date will be used by applications looking for a driver update. Due to the inconsistency of
the use of dates and versions this evolved as the best scheme for looking for driver updates.
Source: The date comes from one of the following sources depending on the driver type:
PCL monolithic - driver file
PostScript - PPD file
MS unidriver - GPD file
The appropriate data file MUST be touched each time the driver is rolled. The date MUST be touched
each time the driver is rolled.
Example: 01/01/2001
Status: Required.
version <string>

APPENDIX A-continued

XML MESSAGE RETURNED BY IADD DATABASE (step 514, FIG. 5)

Purpose: This attribute will contain the driver's version number. An installer can use this to know
whether a driver on the Internet is newer than a driver the user may already have. This version should
match the version put in the inf file (if one exists). Any format is supported.
Source: Specified by the product division. Possibly contained in the inf file.
Example: v1.0, 1.0.0.1, A.1.0.1
Status: Required.
os platform=<string>
Purpose: Start of a new operating system section. The platform tag represents the operating system
value. Some drivers work on multiple operating systems such as Windows 95 and Windows 98 or
Windows NT 4.0 and Windows 2000. It is usually not necessary to differentiate between subversions
like Windows 2000 and Windows 2000 Professional. Appendix C contains all the legal platform values.
Source: Dictated by Appendix C.
Example: Windows_NT_4, Windows 2000
Status: Required.
NOTE: Only operating systems that share the same basepart should be combined into one attribute file.
DO NOT combine operating systems that use different baseparts in one attribute file!
network_compatible <{0,1}>
Purpose: This BOOL flag allows calling program to know whether driver is compatible for network use.
A value of "0" means not network compatible; a value of "1" means network compatible.
Source: Generally speaking all recent drivers are network compatible. A few older drivers had
problems operating on the network and/or they chewed up tremendous network bandwidth and multiple
such drivers on a network could severely affect network bandwidth.
Example: 1
Status: Required.
installation_method <{INF, MONOLITHIC, AUTOSETUP, MANUALSETUP, others . . . }>
Purpose: This attribute will provide information about whether the driver is INF installable (Windows
AddPrinter), a monolithic, or uses some other method (e.g. non-Windows platform specific installation
method). The intent is to allow the calling program to determine whether or not it can install the driver in
its current configuration.
INF - driver is installed through the inf file (Microsoft Add Printer style). The intent behind this value is
to indicate whether or not the driver could be successfully installed by an application like the Microsoft
AddPrinter Wizard. A driver might have an inf file but not be installable by the Add Printer Wizard. It
might require an HP installer, for example, running as the result of a Plug-in-Play event.
MONOLITHIC - kept for backwards compatibility; means the driver download contains a setup program
to run
AUTOSETUP - similar to MONOLITHIC; once downloaded and decompressed a setup program will
automatically run
MANUALSETUP - similar to AUTOSETUP except the user must manually run the setup program after
decompression
Note: New attribute files should choose between INF, AUTOSETUP, and MANUALSETUP.
Source: The product division should set this value based upon the type of install expected by the driver
package on the Web. Note that an AUTOSETUP install might make use of an inf file but the install is
automatically launched and handled by a setup program. A value of "inf" would be specified for a
package where the files would be downloaded and then a program outside of the package run to read
the inf file and make use of it (e.g. Microsoft Add Printer Wizard, HP Install Network Printer Wizard)
Example: INF
Status: Required.
primary_inf <string>
Some drivers ship with multiple INF files. This attribute will indicate to the calling program which INF file
to use to install the printer driver. The string should contain the primary INF file name (e.g. "hpblaf.inf").
Required if the <installation_method> is "INF".
Source: This is a judgment call by the product division. Generally speaking all recent drivers are
network compatible. A few older drivers had problems operating on the network and/or they chewed up
tremendous network bandwidth and multiple such drivers on a network could severely affect network
bandwidth.
Example: 1
Status: Required if the <installation_method> is "INF".
monolithic_install <string>
Indicates the name of the setup or install program that is called to perform all installation steps. The
calling program would simple invoke this executable to handle the installation. The string should
contain the name of the executable filename that needs to be executed. An example would be
"setup.exe". Required if the <installation_method> is "MONOLITHIC", "AUTOSETUP", or
"MANUALSETUP".
Source: Generally speaking all recent drivers are network compatible. A few older drivers had problems
operating on the network, and several such drivers on a network could severely affect network
bandwidth.
Example: 1
Status: Required if the <installation_method> is "MONOLITHIC", "AUTOSETUP", or "MANUALSETUP"..
storage_format <{WinZip, EXE, Cab, LZ, InfoZip, OCI, others...}>
This attribute will indicate to the calling program how the driver files were compressed. If the calling
program does not have the capability to handle the specified compression format, the calling program
shouldn't try to decompress and install the driver. Required.
WinZip - compressed using the Zip format (current LaserJet default)
EXE - compressed into a self-extracting executable
CAB - compressed as a Microsoft CAB file
LZ - compressed in the LZH format
InfoZip - compression format used by the DeskJet drivers

APPENDIX A-continued

XML MESSAGE RETURNED BY IADD DATABASE (step 514, FIG. 5)

OCI - "One-Click Install"; for ADD wrapped drivers (The ADD (Automatic Driver Download) project involves wrapping zipped executables in an InstallShield "One-Click Install" form.0
Source: Generally speaking all recent drivers are network compatible. A few older drivers had problems operating on the network and/or they chewed up tremendous network bandwidth and multiple such drivers on a network could severely affect network bandwidth.
Example: 1
Status: Required.
additional_install <string>
Purpose: This attribute will indicate the executable filename to be called in the event that the driver provides a post-install executable. It would be used in the event that a driver uses an INF or other installation method, but provides additional steps in the form of an executable to be performed afterward.
Source: Specified by the product division.
Example: register.exe
Status: Optional.
digital_signature <{0, 1}>
Purpose: This Boolean flag indicates whether or not the driver contains a digital signature. This is need for Windows 2000 installs. If the user has a policy set requiring drivers to have digital signatures then the installer could use this flag to determine if this driver is a candidate.
Source: Specified by the product division.
Example: 1
Status: Required.
prerequisites <{0,1}>
Purpose: Used for ADD auto-wrapping with One-Click Install. Indicates whether or not the installation of the driver requires prerequisite steps not handled by the installer. For example, if the user must install a certain version of firmware first or perform other prerequisite steps not covered by the installer then this value should be set to "1". If the installer will cover any prerequisites than this value should be set to "0".
Source: As described above, this should be set if the driver installation requires prerequisite steps not handled by the installer.
Example: 0
Status: Required.
functionality <string>
Purpose: This section should contain a brief summary of the major functionality of the driver. Identify the driver as a (vendor name) driver. NOTE: This text should be displayable to customers.
Source: This information typically would match comments placed on the HP driver download web pages or in a readme file packaged with the driver files.
Example: "Version 2.01 offers increased bi-directional support as well as support for Windows 2000."
Status: Required.
improvement <string>
This section should contain a brief summary of enhancements over previous versions of the driver. NOTE: This text should be displayable to customers and not contain any company confidential information. This tag would be empty for the first release of a driver.
Source: This information typically would match comments placed on the driver download web pages or in a readme file packaged with the driver files.
Example: "Bi-directional support has been greatly enhanced. Support for duplex printing has been added."
Status: Required.
knownIssue <string>
This section should briefly list any known issues still unresolved with this driver. NOTE: This text should be displayable to HP customers and not contain any company confidential information.
Source: This is a judgment call by the product division. Generally speaking all recent drivers are network compatible. A few older drivers had problems operating on the network and/or they chewed up tremendous network bandwidth and multiple such drivers on a network could severely affect network bandwidth.
Example: "Paper jams are not properly reported under Windows 95."
Status: Required.
reserved1 <field1 value, field2 value, ...>
Reserved for future use without requiring a specification change. The characters between the tags should not extend beyond 256 characters.
Source: Generally speaking all recent drivers are network compatible. A few older drivers had problems operating on the network and/or they chewed up tremendous network bandwidth and multiple such drivers on a network could severely affect network bandwidth.
Example: None
Status: Required.

APPENDIX B

USB PORT PRINTER MONITOR ENUMERATION ROUTINE (STEP 204 IN FIG. 2)

```
//----------Copr. 2001 Hewlett Packard Company---------------------------------------
// Description:
//              Accesses the registry to create a vector with the USB port monitors that are installed
//              on the computer. The vector is stored in the class data member: m_USBPortVector.
```

APPENDIX B-continued

USB PORT PRINTER MONITOR ENUMERATION ROUTINE (STEP 204 IN FIG. 2)

```
//              The m_USBPortVector is cleared before the registry is accessed.
//Arguments:
//              NONE
// Example:
// Return Value:
//              NONE
//--------------------------------------------------------------------
void PrinterUtilities::GetUSBPortMonitors( )
{
        const int cBufferSize = 1024;   // Arbitrary initial value.
    HKEY    hKey, hSubKey, hInnerSubKey;
        TCHAR szBuffer[cBufferSize];
        DWORD nSubKeySize = cBufferSize;
        DWORD nInnerKeySize = cBufferSize;
        DWORD dwInnerBufLen = cBufferSize;
        CHAR szSubKeyName[cBufferSize];
        CHAR szInnerSubKeyName[cBufferSize];
        CHAR szParentIDPrefix[cBufferSize];
        CHAR szClass[cBufferSize];
        CHAR szSubKeyPath[cBufferSize];
        FILETIME lastUpdate, innerLastUpdate;
    DWORD   dwBufLen = cBufferSize;
    LONG    IRet;
        USBPort *pUSBPort;
        TraceODS (LEVEL_REGULAR, TRACE_INFO, _T("PrinterUtilities::GetUSBPortMonitors"),
                    0L, _T("START:PrinterUtilities::GetUSBPortMonitors"));
        // Clear the vector
        m_USBPortVector.clear( );
        // Access the registry and look for the MS Standard port monitors
        _tcscpy(szBuffer, "SYSTEM\\CurrentControlSet\\Enum\\USB");
        if(RegOpenKeyEx(HKEY_LOCAL_MACHINE,
                TEXT(szBuffer),
                0, KEY_ENUMERATE_SUB_KEYS | KEY_READ &hKey) !=ERROR_SUCCESS)
                return;
        // Now enumerate all the keys that are listed in the USB port or the
        int nIndex = 0;
    do
    {
        nSubKeySize = cBufferSize;
// Initialize the buffer before trying to enumerate
        dwBufLen = cBufferSize;
// rest the buffer every time
        IRet = RegEnumKeyEx(hKey, nIndex, szSubKeyName,
            &nSubKeySize, NULL, NULL, NULL, &lastUpdate);
        if (IRet == ERROR_SUCCESS)
        {
            _stprintf(szSubKeyPath, "%s\\%s", szBuffer, szSubKeyName);
            // Get the PnP ID
            if(RegOpenKeyEx(HKEY_LOCAL_MACHINE,
            TEXT(szSubKeyPath),
            0, KEY_ENUMERATE_SUB_KEYS | KEY_READ &hSubKey) !=
ERROR_SUCCESS)
            {
                RegCloseKey(hKey);
                continue;
            }
            nInnerKeySize = cBufferSize;
            dwInnerBufLen = cBufferSize;
            szInnerSubKeyName[0] = '\0';
            IRet = RegEnumKeyEx(hSubKey,
                0,
                szInnerSubKeyName,
                &dwInnerBufLen, NULL, NULL, NULL,
                &innerLastUpdate);
            if (IRet == ERROR_SUCCESS)
            {
                dwBufLen = cBufferSize;
                // Get the PnP ID
                _stprintf(szSubKeyPath, "%s\\%s", szSubKeyPath,
szInnerSubKeyName);
                if(RegOpenKeyEx(HKEY_LOCAL_MACHINE,
                TEXT(szSubKeyPath),
                0, KEY_QUERY_VALUE, &hInnerSubKey)== ERROR_SUCCESS)
                {
                // Don't check for the return code. If the key is not there it is blank
                szParentIDPrefix[0] = '\0';
                RegQueryValueEx(hInnerSubKey,
```

APPENDIX B-continued

USB PORT PRINTER MONITOR ENUMERATION ROUTINE (STEP 204 IN FIG. 2)

```
                TEXT("ParentIdPrefix"),
                NULL,
                NULL,
                (LPBYTE)szParentIDPrefix,
                &dwBufLen);
            dwBufLen = cBufferSize;
            // Don't check for the return code. If the key is not there it is blank
            szClass[0] = '\0';
            RegQueryValueEx(hInnerSubKey,
                TEXT("Class"),
                NULL,
                NULL,
                (LPBYTE)szClass,
                &dwBufLen);
            RegCloseKey(hInnerSubKey);
            }
            RegCloseKey(hSubKey);
            // Add the port
            pUSBPort = new USBPort( );
            // create a new instance of USB Port
                pUSBPort->szUSBPortMonitorName = szSubKeyName;
                pUSBPort->szPortID = szInnerSubKeyName;
                pUSBPort->szParentIdPrefix = szParentIDPrefix;
                pUSBPort->szClass = szClass;
                m_USBPortVector.push_back(pUSBPort);
            }
            // Increment the index
            nIndex++;
        }
    } while (IRet == ERROR_SUCCESS);
    RegCloseKey(hKey);
} //GetUSBPortMonitors
```

What is claimed is:

1. An automated method for testing peripherals and their drivers, including at least one peripheral residing on a network of the type that connects multiple computers and peripherals together, and able to test peripherals on networks having a proxy server, comprising:

selecting for testing one or more peripherals which a computer's registry indicates previously have been installed and which accordingly may still be in communicative relationship with the computer, including at least the one peripheral residing on a network of the type that connects multiple computers and peripherals together;

testing, independently of any driver, whether the computer can communicate with each selected peripheral, and reporting any communication or peripheral defects, communicating with the at least one peripheral residing on a network in a way that bypasses any proxy server that may be present on the network and that the computer may be programmed to use when communication with the network;

finding and then testing a driver corresponding to each selected peripheral, and reporting any missing or defective drivers;

guided by information indicating the type of each selected peripheral, obtaining information including the identities and versions of drivers for that type of peripheral which are available for installation, comparing this information to information indicating the identity and version of any drivers found that correspond to the same type of peripheral, and reporting any inappropriate or older version drivers; and on one or more occasions when this method is practiced, installing one or more available drivers to replace missing, defective, inappropriate, or older version drivers.

2. A method in accordance with claim 1 wherein the step of selecting one or more peripherals for testing comprises:

detecting at least one or more of the peripherals in communicative relationship to a computer, as reported by the computer's operating system;

displaying a list of the detected peripherals to a user; and accepting the user's selection of which peripherals to test.

3. A method in accordance with claim 2 wherein the detecting step detects only peripherals that are printers.

4. A method in accordance with claim 2 wherein the detecting step detects only peripherals that are supplied by a common vendor.

5. A method in accordance with claim 1 wherein the step of testing whether the computer can communicate comprises:

enumerating the peripherals connected to one or more computer ports;

searching the enumeration for one or more selected peripherals; and attempting to communicate with any selected peripherals found in the enumeration.

6. A method in accordance with claim 5 wherein the enumeration is applied to one or more Universal Serial Bus or equivalent ports supporting multiple, individually addressable peripherals.

7. A method in accordance with claim 1 wherein the step of testing whether the computer can communicate further comprises:

seeking from the operating system the network address of one or more selected peripherals; and if one or more network addresses are found, attempting to communicate with the selected peripherals whose network addresses are found.

8. A method in accordance with claim 7 wherein, if the network address of a peripheral is not found, and if the peripheral has assigned to it a name or port name or host name, then seeking a network address from a domain name server to which one or more of the peripheral's assigned names are submitted.

9. A method in accordance with claim 8 wherein, if a submitted name has multiple parts separated by forward or reverse slashes, only the right-most part is submitted to the domain name server either alone or with additional information.

10. A method in accordance with claim 7 wherein, when the operating system does not provide a network address, then the method further comprises:
   prompting the user to supply the peripheral's assigned network address; and
   if an address is supplied, then attempting to communicate with the peripheral at that address.

11. A method in accordance with claim 1 wherein the step of testing whether the computer can communicate further comprises:
   seeking from the operating system a port name for each peripheral; and
   if a peripheral's port name indicates it is connected to a conventional parallel or serial port, such as the port names "LPTx" or "COMy" indicating a connection to parallel port x or serial port y, then attempting to communicate with the peripheral through the particular port, if necessary, multiple times with the successive attempts spaced apart by a time delay interval.

12. A method in accordance with claim 1 wherein the step of testing a driver comprises:
   checking for the presence of all the driver's component files and also checking the integrity of those files.

13. A method in accordance with claim 12 wherein the integrity checking step comprises:
   checking for any zero-length files.

14. A method in accordance with claim 1 wherein the comparing step further comprises:
   comparing driver versions by comparing the last revision dates of one or more driver component files.

15. A method in accordance with claim 14 wherein the step of comparing the last revision dates comprises comparing the last revision dates of a driver component data file from each of the compared drivers.

16. A method in accordance with claim 1 wherein the obtaining step comprises:
   accessing a server over a network;
   interrogating a data base on the server with a query that specifies the type of peripheral; and
   receiving back one or more device driver descriptions.

17. A method in accordance with claim 16 wherein the device driver descriptions are received back in XML or equivalent format, and which further comprises:
   transferring the XML formatted data into a data structure from which the data may be conveniently accessed during the comparison step and the step of determining whether a driver is inappropriate or an older version.

18. A method in accordance with claim 1 wherein the computer has a first operating system, and wherein the method further comprises:
   determining the operating system of the computer;
   when obtaining information including the identities and versions of drivers, also obtaining information indicating driver operating system compatibility; and
   when comparing, also comparing information indicating driver operating system compatibility of any drivers found to the operating system version of the computer.

19. A method in accordance with claim 18 which further comprises:
   when the comparing step reveals that the information indicating a driver's operating system compatibility does not precisely match the operating system of the computer, performing the additional step of determining, by reference to tables or rules, whether the two operating systems are compatible enough to warrant reporting the driver as likely to be compatible with the operating system of the computer when a more compatible driver is unavailable.

20. A method in accordance with claim 18 wherein the installing step comprises
   having available at least two different driver installation programs each intended for use with a different operating system; and
   selecting, for use in driver installation, the driver installation program most compatible with the computer's operating system.

21. An automated method for testing peripherals and their drivers comprising:
   selecting for testing one or more peripherals which a computer's registry indicates previously have been installed and which accordingly may still be in communicative relationship with the computer, the computer connecting to at least one Universal Serial Bus or equivalent port supporting multiple, individually addressable peripherals, and the selected peripherals including at least one peripheral connected to a Universal Serial Bus or equivalent port and having an assigned device ID string;
   testing, independently of any driver, whether the computer can communicate with each selected peripheral, testing all selected peripherals connected to a Universal Serial Bus or equivalent port by enumerating devices connected to the at least one Universal Serial Bus or equivalent port and then searching the enumeration for the device ID strings of the selected peripherals connected to a Universal Serial Bus or equivalent port, and reporting any communication or peripheral defects, including reporting any selected peripherals connected to a Universal Serial Bus or equivalent port when the selected peripheral's device ID string is not reported during enumeration or when the selected peripheral's status, as reported by the enumeration, is "disconnected" or its equivalent;
   finding and then testing a driver corresponding to each selected peripheral, and reporting any missing or defective drivers;
   guided by information indicating the type of each selected peripheral, obtaining information including the identities and versions of drivers for that type of peripheral which are available for installation, comparing this information to information indicating the identity and version of any drivers found that correspond to the same type of peripheral, and reporting any inappropriate or older version drivers; and
   on one or more occasions when this method is practiced, installing one or more available drivers to replace missing, defective, inappropriate, or older version drivers.

22. A method in accordance with claim 21 wherein the step of selecting one or more peripherals for testing comprises:
   detecting at least one or more of the peripherals in communicative relationship to a computer, as reported by the computer's operating system;
   displaying a list of the detected peripherals to a user; and
   accepting the user's selection of which peripherals to test.

23. A method in accordance with claim 22 wherein the detecting step detects only peripherals that are printers.

24. A method in accordance with claim 22 wherein the detecting step detects only peripherals that are supplied by a common vendor.

25. A method in accordance with claim 21 wherein the step of testing whether the computer can communicate further comprises:
seeking from the operating system the network address of one or more selected peripherals; and
if one or more network addresses are found, attempting to communicate with the selected peripherals whose network addresses are found.

26. A method in accordance with claim 25 wherein, if the network address of a peripheral is not found, and if the peripheral has assigned to it a name or port name or host name, then seeking a network address from a domain name server to which one or more of the peripheral's assigned names are submitted.

27. A method in accordance with claim 26 wherein, if a submitted name has multiple parts separated by forward or reverse slashes, only the right-most part is submitted to the domain name server either alone or with additional information.

28. A method in accordance with claim 25 wherein, when the operating system does not provide a network address, then the method further comprises:
prompting the user to supply the peripheral's assigned network address; and
if an address is supplied, then attempting to communicate with the peripheral at that address.

29. A method in accordance with claim 21 wherein the step of testing whether the computer can communicate further comprises:
seeking from the operating system a port name for each peripheral; and
if a peripheral's port name indicates it is connected to a conventional parallel or serial port, such as the port names "LPTx" or "COMy" indicating a connection to parallel port x or serial port y, then attempting to communicate with the peripheral through the particular port, if necessary, multiple times with the successive attempts spaced apart by a time delay interval.

30. A method in accordance with claim 21 wherein the step of testing a driver comprises:
checking for the presence of all the driver's component files and also checking the integrity of those files.

31. A method in accordance with claim 30 wherein the integrity checking step comprises:
checking for any zero-length files.

32. A method in accordance with claim 21 wherein the comparing step further comprises:
comparing driver versions by comparing the last revision dates of one or more driver component files.

33. A method in accordance with claim 32 wherein the step of comparing the last revision dates comprises the step of comparing the last revision dates of a driver component data file from each of the compared drivers.

34. A method in accordance with claim 21 wherein the obtaining step comprises:
accessing a server over a network;
interrogating a data base on the server with a query that specifies the type of peripheral; and
receiving back one or more device driver descriptions.

35. A method in accordance with claim 34 wherein the device driver descriptions are received back in XML or equivalent format, and which further comprises:
transferring the XML formatted data into a data structure from which the data may be conveniently accessed during the comparison step and the step of determining whether a driver is inappropriate or an older version.

36. A method in accordance with claim 21 wherein the computer has a first operating system, and wherein the method further comprises:
determining the operating system of the computer;
when obtaining information including the identities and versions of drivers, also obtaining information indicating driver operating system compatibility; and
when comparing, also comparing information indicating driver operating system compatibility of any drivers found to the operating system version of the computer.

37. A method in accordance with claim 36 which further comprises:
when the comparing step reveals that the information indicating a driver's operating system compatibility does not precisely match the operating system of the computer, performing the additional step of determining, by reference to tables or rules, whether the two operating systems are compatible enough to warrant reporting the driver as likely to be compatible with the operating system of the computer when a more compatible driver is unavailable.

38. A method in accordance with claim 36 wherein the installing step comprises
having available at least two different driver installation programs each intended for use with a different operating system; and
selecting, for use in driver installation, the driver installation program most compatible with the computer's operating system.

39. An automated method for testing peripherals and their drivers, including at least one peripheral connecting to a parallel or serial port, comprising:
selecting for testing one or more peripherals which a computer's registry indicates previously have been installed and which accordingly may still be in communicative relationship with the computer, including at least the one peripheral having an assigned device identification string and connecting to a parallel or serial port of the computer;
testing, independently of any driver, whether the computer can communicate with each selected peripheral, and in particular testing selected parallel or serial port peripherals by making one or, if necessary, multiple low-level operating system calls, "DeviceIOControl" or equivalent, spaced apart by a time delay interval, these low-level operating system calls sending a command to a selected parallel or serial port peripheral which command directs the peripheral to return a device identification string, and reporting any communication or peripheral defects, including any failure of a selected parallel or serial port peripheral to return a device identification string in response to the one or more low-level operating system calls that were directed to that peripheral;
finding and then testing a driver corresponding to each selected peripheral, and reporting any missing or defective drivers;
guided by information indicating the type of each selected peripheral, obtaining information including the identities and versions of drivers for that type of peripheral which are available for installation, comparing this information to information indicating the identity and version of any drivers found that correspond to the same type of peripheral, and reporting any inappropriate or older version drivers; and on one or more occasions when this method is practiced, installing one or more available drivers to replace missing, defective, inappropriate, or older version drivers.

40. A method in accordance with claim 39 wherein the step of selecting one or more peripherals for testing comprises:
   detecting at least one or more of the peripherals in communicative relationship to a computer, as reported by the computer's operating system;
   displaying a list of the detected peripherals to a user; and
   accepting the user's selection of which peripherals to test.

41. A method in accordance with claim 40 wherein the detecting step detects only peripherals that are printers.

42. A method in accordance with claim 40 wherein the detecting step detects only peripherals that are supplied by a common vendor.

43. A method in accordance with claim 39 wherein the step of testing whether the computer can communicate comprises:
   enumerating the peripherals connected to one or more computer ports;
   searching the enumeration for one or more selected peripherals; and
   attempting to communicate with any selected peripherals found in the enumeration.

44. A method in accordance with claim 43 wherein the enumeration is applied to one or more Universal Serial Bus or equivalent ports supporting multiple, individually addressable peripherals.

45. A method in accordance with claim 39 wherein the step of testing whether the computer can communicate further comprises:
   seeking from the operating system the network address of one or more selected peripherals; and
   if one or more network addresses are found, attempting to communicate with the selected peripherals whose network addresses are found.

46. A method in accordance with claim 45 wherein, if the network address of a peripheral is not found, and if the peripheral has assigned to it a name or port name or host name, then seeking a network address from a domain name server to which one or more of the peripheral's assigned names are submitted.

47. A method in accordance with claim 46 wherein, if a submitted name has multiple parts separated by forward or reverse slashes, only the right-most part is submitted to the domain name server either alone or with additional information.

48. A method in accordance with claim 45 wherein, when the operating system does not provide a network address, then the method further comprises:
   prompting the user to supply the peripheral's assigned network address; and
   if an address is supplied, then attempting to communicate with the peripheral at that address.

49. A method in accordance with claim 39 wherein the step of testing whether the computer can communicate further comprises:
   seeking from the operating system a port name for each peripheral; and
   if a peripheral's port name indicates it is connected to a conventional parallel or serial port, such as the port names "LPTx" or "COMy" indicating a connection to parallel port x or serial port y, then attempting to communicate with the peripheral by making one or more low-level operating system calls to that particular parallel or serial port.

50. A method in accordance with claim 39 wherein the step of testing a driver comprises:
   checking for the presence of all the driver's component files and also checking the integrity of those files.

51. A method in accordance with claim 50 wherein the integrity checking step comprises:
   checking for any zero-length files.

52. A method in accordance with claim 39 wherein the comparing step further comprises:
   comparing driver versions by comparing the last revision dates of one or more driver component files.

53. A method in accordance with claim 52 wherein the step of comparing the last revision dates comprises the step of comparing the last revision dates of a driver component data file from each of the compared drivers.

54. A method in accordance with claim 39 wherein the obtaining step comprises:
   accessing a server over a network;
   interrogating a data base on the server with a query that specifies the type of peripheral; and
   receiving back one or more device driver descriptions.

55. A method in accordance with claim 54 wherein the device driver descriptions are received back in XML or equivalent format, and which further comprises:
   transferring the XML formatted data into a data structure from which the data may be conveniently accessed during the comparison step and the step of determining whether a driver is inappropriate or an older version.

56. A method in accordance with claim 39 wherein the computer has a first operating system, and wherein the method further comprises:
   determining the operating system of the computer;
   when obtaining information including the identities and versions of drivers, also obtaining information indicating driver operating system compatibility; and
   when comparing, also comparing information indicating driver operating system compatibility of any drivers found to the operating system version of the computer.

57. A method in accordance with claim 56 which further comprises:
   when the comparing step reveals that the information indicating a driver's operating system compatibility does not precisely match the operating system of the computer, performing the additional step of determining, by reference to tables or rules, whether the two operating systems are compatible enough to warrant reporting the driver as likely to be compatible with the operating system of the computer when a more compatible driver is unavailable.

58. A method in accordance with claim 56 wherein the installing step comprises
   having available at least two different driver installation programs each intended for use with a different operating system; and
   selecting, for use in driver installation, the driver installation program most compatible with the computer's operating system.

* * * * *